United States Patent [19]

Howard et al.

[11] Patent Number: 4,515,436
[45] Date of Patent: May 7, 1985

[54] SINGLE-MODE SINGLE-POLARIZATION OPTICAL FIBER

[75] Inventors: Richard E. Howard, Holmdel; William Pleibel, Matawan; Jay R. Simpson, Fanwood; Rogers H. Stolen, Rumson, all of N.J.

[73] Assignee: AT&T Bell Laboratories, Murray Hill, N.J.

[21] Appl. No.: 464,059

[22] Filed: Feb. 4, 1983

[51] Int. Cl.$^3$ .................. G02B 5/14; G02B 5/172
[52] U.S. Cl. .................. 350/96.33; 350/96.29; 350/96.30; 350/96.34
[58] Field of Search .............. 350/96.29, 96.30, 96.31, 350/96.33, 96.34, 96.10

[56] References Cited

U.S. PATENT DOCUMENTS

| | | | |
|---|---|---|---|
| 3,535,017 | 10/1970 | Miller | 350/96.33 |
| 3,659,916 | 5/1972 | Marcatili | 350/96.12 |
| 3,997,241 | 12/1976 | Nishida et al. | 350/96.33 |
| 4,106,847 | 8/1978 | Arnaud | 350/96.31 |
| 4,134,642 | 1/1979 | Kapron et al. | 350/96.33 |
| 4,179,189 | 12/1979 | Kaminow et al. | 350/96.33 |
| 4,184,744 | 1/1980 | Onoda et al. | 350/96.33 |
| 4,185,890 | 1/1980 | Onoda et al. | 350/96.33 |
| 4,274,854 | 6/1981 | Pleibel et al. | 350/96.3 |
| 4,306,767 | 12/1981 | Kawachi et al. | 350/96.30 |
| 4,307,938 | 12/1981 | Dyott | 350/96.15 |
| 4,354,736 | 10/1982 | Maklad et al. | 350/96.29 |
| 4,395,270 | 7/1983 | Blankenship et al. | 65/3.12 |
| 4,478,489 | 10/1984 | Blankenship et al. | 350/96.30 |
| 4,480,897 | 11/1984 | Okamoto et al. | 350/96.30 |

FOREIGN PATENT DOCUMENTS 2635656 9/1978 Fed. Rep. of Germany ... 350/96.30

OTHER PUBLICATIONS

Hosaka et al., "Low-Loss Single . . . Birefringence", Electronics Lett., 7/81, vol. 17, No. 15, pp. 530-531.
Okamoto et al., "Stress Analysis . . . Method", IEEE Journal of Quant. Elect., vol. QE-17, No. 10, 10/81, pp. 2123-2129.
Okamoto et al., "Linearly Single Polarization . . . Dispersion", IEEE Journal of Quant. Elect., vol. QE-18, No. 4, 4/82, pp. 496-503.
Payne et al., "Development of Low- and . . . Fibers", IEEE Journal of Quant. Elect., vol. QE-18, No. 4, 4/82, pp. 477-487.
Stolen et al., "Linear Polarization . . . Fibers", Appl. Phys. Lett., vol. 33, No. 8, 10/78, pp. 699-701.
Ramaswamy et al., "Birefringence in . . . Fibers", Applied Optics, vol. 18, No. 24, 12/79, pp. 4080-4084.
Okoshi et al., "Single Polarisation . . . Core", Electronics Letters, 8/80, vol. 16, No. 18, pp. 712-713.
Matsumura et al., "Fundamental Study . . . Fibres", Proceedings of 6th Conf. (Europe) on Optical Comm., 9/80, pp. 1-4.
Eickhoff, "In-Line Fibre-Optic Polariser", Electronics Lett., vol. 16, No. 20, 9/80, pp. 762-764.
Bergh et al., "Single-Mode . . . Polarizer", Optics Lett., vol. 5, No. 11, 11/80, pp. 479-481.
Hosaka et al., "Single Mode Fibres . . . Sides of Core", Electronics Lett., vol. 17, No. 5, 3/81, pp. 191-193.
Okoshi, "Single-Polarization . . . Optical Fibers", IEEE Journal of Quant. Elect., QE-17, No. 6, 6/81, pp. 879-884.
Eickhoff, "Stress-Induced . . . Single Mode Fibers", Optics Letters, vol. 7, No. 12, pp. 629-631, 12/82.
Yen et al., "Birefringent Optical . . . Single Mode Fiber", Optics Letters, vol. 6, No. 6, 6/81, pp. 278-280.

Primary Examiner—William L. Sikes
Assistant Examiner—Brian M. Healy
Attorney, Agent, or Firm—Wendy W. Koba; Erwin W. Pfeifle

[57] ABSTRACT

The present invention relates to a single-mode single-polarization optical fiber which is capable of functioning as an in-line fiber polarizer which allows only one polarization of the fundamental mode to propagate along the fiber. In structure, the fiber comprises a central core region (10) and a cladding region (12) which is substantially in contact with the central core region. The various regions are formed such that the refractive index of an outer cladding region is greater than the refractive index of an inner cladding region but less than that of the core region. The arrangement of the present invention produces stress-birefringence between the cladding regions and the central core region sufficient to split the two orthogonal polarizations ($n_{\|}$ and $n_{\perp}$) of the fundamental mode such that the desired polarization propagates freely and the undesired polarization is attenuated by tunneling through the cladding layers.

17 Claims, 6 Drawing Figures

SINGLE-MODE SINGLE-POLARIZATION OPTICAL FIBER

BACKGROUND OF THE INVENTION

1. Field of the Invention

The present invention relates to a single-mode single-polarization (SMSP) optical fiber and, more particularly to an SMSP optical fiber wherein high stress-induced birefringence is utilized to split the two polarizations of the fundamental mode and a cladding structure is included which attenuates one polarization by tunneling. The resultant fiber may, therefore, be utilized as a fiber polarizer.

2. Description of the Prior Art

Optical waveguides capable of transmitting power with only one direction of polarization are desirable in many different applications, such as fiber sensors, in-line fiber devices, Raman lasers, and the like. However, an ordinary axially symmetrical single-mode fiber is a "two-mode" fiber because two orthogonally polarized $HE_{||}$ modes can be propagated in it. This fact results in the instability of the polarization state of the propagated mode when geometrical or dielectric perturbations exist in the fiber. To minimize these adverse effects, polarization-preserving fibers, as distinguished from single polarization fibers, have been developed, where these fibers may be categorized into three basic types; (1) elliptical-core fibers, (2) stress-induced birefringent fibers, and (3) side-pit fibers.

One example of a prior art elliptical core fiber is found in U.S. Pat. No. 4,106,847 issued to J. A. Arnaud on Aug. 15, 1978, where it is shown that an elliptical core fiber, as opposed to a circular core fiber, may be more efficiently coupled to a light emitting source having an elongated source area, such as in a heterojunction laser or an edge-emitting light emitting diode.

U.S. Pat. No. 4,274,854 issued to W. Pleibel et al on June 23, 1981 discloses a prior art method of fabricating a polarization-preserving optical fiber which produces a stress-induced birefringence therein. The method includes depositing the cladding layers and the core layer within a specially-shaped substrate tube, collapsing the resultant product into a preform and drawing a fiber therefrom. The difference in thermal expansion among the various layers, combined with their inherent non-circularity, provide the stress-induced birefringence and hence the polarization-preserving properties of the resultant optical fiber.

All of the above-cited prior art arrangements, however, relate to polarization-preserving fibers, where such fibers are not capable of suppressing, or eliminating, an undesired polarization of the transmitted mode. A scheme which was intended to suppress the undesired polarization is the side-pit fiber arrangement described in the article "Single-Polarization Single-Mode Optical Fibre With Refractive-Index Pits on Both Sides of the Core" by T. Okoshi et al appearing in *Electronics Letters*, Vol. 16, No. 18, Aug. 28, 1980 at pp. 712–713. An axially nonsymmetrical index distribution featuring two pits is proposed, one pit on either side of the core. In this structure, the two orthogonally polarized $HE_{||}$ modes have cutoff wavelengths which differ so that in a certain narrow frequency range one mode is attenuated while the other is transmitted. At higher frequencies, both polarizations propagate and the fiber will preserve linear polarization along both principal axes. The effective birefringence is geometrical in nature and is controlled by the index difference between the core, the cladding, and the side pits. For a relative index difference ($\Delta n/n$) of 1% the predicted single-polarization bandwidth is about 2.5%. It was suggested by Okoshi et al that for a practical single-polarization fiber a relative index difference of approximately 2% would be required.

The side pit structure was investigated experimentally in an article entitled "Single Mode Fibres with Asymmetrical Refractive Index Pits on Both Sides of Core" by T. Hosaka et al appearing in *Electronics Letters*, Vol. 17, No. 5, March, 1981, at pp. 191–193. Here it is verified that side pit fibers preserve linear polarization along the fiber's two principal axes. No single-polarization (in the sense of action as a fiber polarizer) was reported. It was later learned that much of the birefringence of the fiber is stress-induced and modifications were introduced to produce high-birefringence, low-loss polarization preserving fibers as described in the article "Low-Loss Single Polarization Fibres with Asymmetrical Strain Birefringence" by T. Hosaka et al appearing in *Electronics Letters*, Vol. 17, No. 15, July 23, 1981 at pp. 530–531. An alternative form of side-pit fiber is described in the article "Side-Tunnel Fibre: An Approach to Polarisation-Maintaining Optical Waveguiding Scheme" by T. Okoshi et al appearing in *Electronics Letters*, Vol. 18, No. 19, Sept. 26, 1982 at pp. 824–826, where the side pits are replaced by hollow tunnels. Such fibers are predicted to have bandwidths of 7% for a 1% relative index difference. In practice, however, true single polarization behavior has not been observed.

Thus, there remains a need for a fiber polarizer capable of completely suppressing one of the fundamental mode polarizations, is capable of operating over a large bandwidth, is compatible with typical fibers and lends itself to readily available production techniques.

SUMMARY OF THE INVENTION

The present invention addresses itself to the need remaining in the prior art and relates to a single-polarization single-mode optical fiber wherein high stress-induced birefringence is utilized to split the two polarizations of the fundamental mode and a cladding structure is included which attenuates one polarization by tunneling.

It is an aspect of the present invention to form a fiber polarizer wherein the stress-induced splitting of the two perpendicular polarizations of the fundamental mode is large enough so that one polarization is attenuated by tunneling, or leaking into the outer cladding while the other, desired, polarization propagates down the fiber core with low loss.

Yet another aspect of the present invention relates to the arrangement of the cladding layers wherein an inner low-index cladding allows the propagation constant of the guided mode to drop below the index of the outer cladding layer, while the inner cladding layer is thin enough to enhance tunneling of the undesired polarization.

A further aspect of the present invention is to provide an in-line fiber polarizer which comprises significantly low insertion loss, low coupling loss and high extinction ratio such that a polarizer formed in accordance with the present invention may be employed, for example, in a fiber isolater, multiplexer, filter, tunable optical fiber, or fiber attenuator.

Other and further aspects of the present invention will become apparent during the course of the following description and by reference to the accompanying drawings.

BRIEF DESCRIPTION OF THE DRAWINGS

Referring now to the drawings, where like numerals represent like parts in several views.

DETAILED DESCRIPTION

Figure 1:
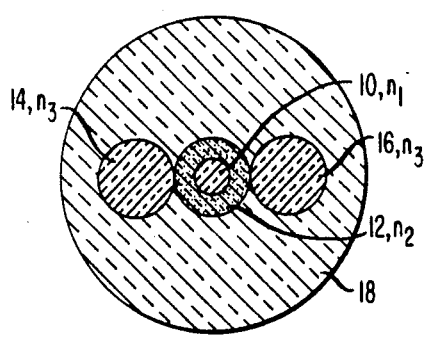
FIG. 1 illustrates a cross-sectional view of a fiber polarizer formed in accordance with the present invention.

Referring now to the drawings, FIG. 1 illustrates a cross-sectional view of a fiber polarizer formed in accordance with the present invention. A core region 10 is surrounded by a cladding layer 12, where a pair of stress lobes 14 and 16 are disposed on either side of cladding layer 12 in a silica substrate 18. Although core region 10, cladding layer 12, and stress lobes 14 and 16 are illustrated as comprising circular cross-sections, it is to be understood that each component may comprise an alternative cross-sectional shape, for example, elliptical, and remain within the scope of the present invention. In one embodiment of the present invention, core region 10 may comprise germanium-doped $SiO_2$, cladding layer 12 may comprise flourine-doped $SiO_2$, and stress lobes 14 and 16 may comprise boron/germanium-doped $SiO_2$. In order to provide wave guidance primarily within core region 10, the refractive index of cladding layer 12, denoted $n_2$, and the refractive index of silica substrate 18, denoted $n_3$, must be less than the refractive index, $n_1$, of core 10, and, in particular, $n_2 < n_3 < n_1$. It is to be noted that in operation of the present invention the refractive index of stress lobes 14 and 16 may be the same or less than that of substrate 18. If the refractive index of stress lobes 14 and 16 is greater than that of substrate 18, tunneling will take place into the stress lobes. In accordance with the present invention, the presence of stress lobes 14 and 16 creates a sufficient birefringence for the wave traveling down core region 10 so as to split the two orthogonal polarizations, $n_{||}$, and $n_\perp$, of the fundamental mode, ($\delta n$ is denoted as the birefringence and is defined as $n_{||} - n_\perp$) where the undesired polarization of propagation is attenuated by tunneling through cladding layer 12.

Figure 2:
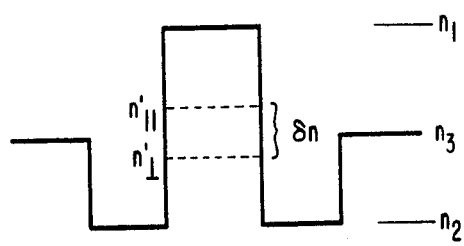
FIG. 2 illustrates a refractive index profile illustrating the principle of operation of the present invention.

A refractive index profile illustrated in FIG. 2 is helpful in explaining the basic principle of operation of a fiber polarizer formed in accordance with the present invention. As shown, the profile illustrates three separate refractive indices where $n_1 > n_3 > n_2$, and the guided polarization of the fundamental mode is denoted $n_{||}$ and the unguided polarization is denoted $n_\perp$. As shown, the guided polarization $n_{||}$ is split from the unguided polarization $n_\perp$ by the above-defined amount $\delta n$, the stress-induced birefringence. In an exemplary fiber polarizer formed in accordance with the present invention as illustrated in FIG. 1, $\delta n$ is approximately equal to 10% of $n_3 - n_1$, or approximately $5 \times 10^{-4}$. It is to be understood that birefringence is directly related to bandwidth, where a larger $\delta n$ results in a wider operational bandwidth for the fiber polarizer. The stress induced by stress lobes 14 and 16 sufficiently splits the two polarizations so as to raise guided polarization $n_{||}$ above the refractive index $n_3$ of substrate 18, while forcing unguided polarization $n_\perp$ to drop below the refractive index $n_3$ and attenuate through tunneling. Ideally, there will be stress-induced birefringence present at core region 10, but not at substrate 18. In fact, for the configuration illustrated in FIG. 1, some birefringence will exist outside core region 10 which acts to reduce the operable bandwidth of the polarizer. The birefringence decreases with distance from core 10 so that maximum bandwidth requires a large inner cladding 12. However, this inner cladding region 12 should be narrow for rapid tunneling loss of the undesired polarization. Therefore, a trade-off exists between providing rapid tunneling loss and providing a large bandwidth.

Figure 3:
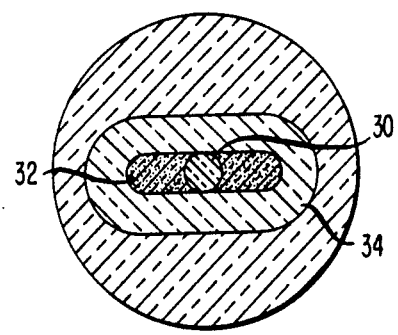
FIG. 3 illustrates a cross-sectional view of an alternative embodiment of a fiber polarizer formed in accordance with the present invention.

A cross-sectional view of an alternative fiber polarizer formed in accordance with the present invention which provides both large bandwidth and rapid tunneling loss is illustrated in FIG. 3. A core region 30 is surrounded by a highly elliptical inner cladding layer 32 which is in turn surrounded by an outer cladding layer 34. In FIG. 3, outer cladding layer 34 comprises an elliptical cross-section. However, it is to be understood that outer layer 34 may comprise any suitable cross-section form. In one embodiment of the present invention, core region 30 may comprise $SiO_2$, inner cladding layer 32 may comprise boron doped $SiO_2$, and outer cladding layer 34 may comprise fluorine-doped $SiO_2$.

In order to provide wave guidance primarily within core region 30, the refractive indices of inner cladding layer 32 and outer cladding layer 34, denoted $n_2$ and $n_3$, respectively, must be less than the refractive index, $n_1$, of core region 30, and in particular $n_2 > n_3 > n_1$. In accordance with the present invention, inner cladding layer 32 comprises a sufficiently high ellipticity such that the minor axis of inner cladding layer 32, is essentially equal to the radius of core region 30. This large ellipticity of inner cladding layer 32 thereby induces a large stress on the fiber, sufficient to significantly separate the two polarizations of the fundamental mode, denoted $n_{||}$ and $n_\perp$.

In the exemplary embodiment of the present invention illustrated in FIG. 3, inner cladding 32 in association with its highly elliptical cross-section, provides both the necessary low refractive index cladding and stress-induced birefringence to form a fiber polarizer in accordance with the present invention. The embodiment as illustrated has the advantage that the birefringence falls off very quickly outside core region 30 along the minor axis of inner cladding 32 and, therefore, the operable bandwidth is little affected by the presence of birefringence outside core region 30.

In one particular exemplary arrangement of a fiber polarizer formed as illustrated in FIG. 3, core region 30 may comprise $SiO_2$, inner cladding layer 32 may comprise boron-doped $SiO_2$, and outer cladding layer 34 may comprise fluorine-doped $SiO_2$. Formed as such, a fiber polarizer may comprise a $\delta n$ approximately equal to $4.7 \times 10^{-4}$, as measured from a beat length $L=1.1$ mm at $\lambda=514.5$ nm. The extinction ratio of a 1.2 m section of fiber polarizer formed in accordance with the present invention is approximately 30 dB at 633 nm, where insertion loss is approximately 2.3 dB, including end reflections and coupling loss.

Figure 4:
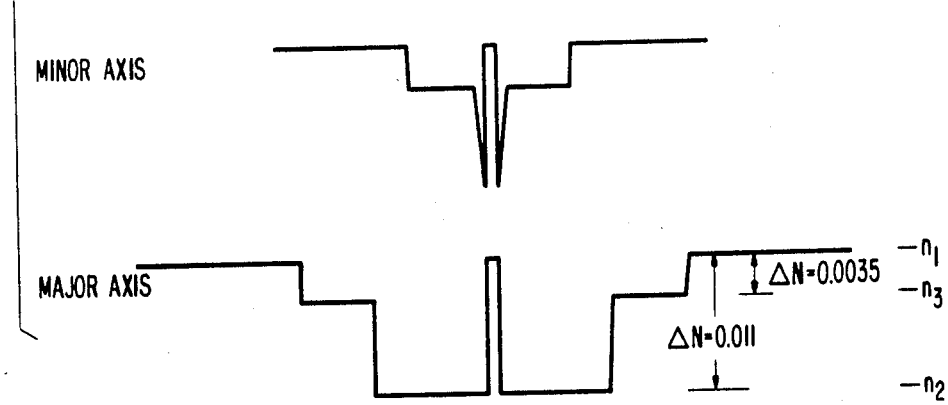
FIG. 4 illustrates both the major axis and minor axis refractive index profiles of a fiber polarizer formed as illustrated in FIG. 3.

The refractive index profile for a fiber polarizer formed in accordance with the embodiment of the present invention illustrated in FIG. 3 is shown in FIG. 4, where both the profile related to the major axis of the fiber and the profile related to the minor axis of the fiber are illustrated.

Figure 5:
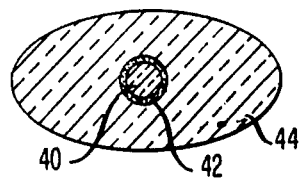
FIG. 5 illustrates an alternative embodiment of the present invention capable of decreasing signal loss at longer wavelengths.
Figure 6:
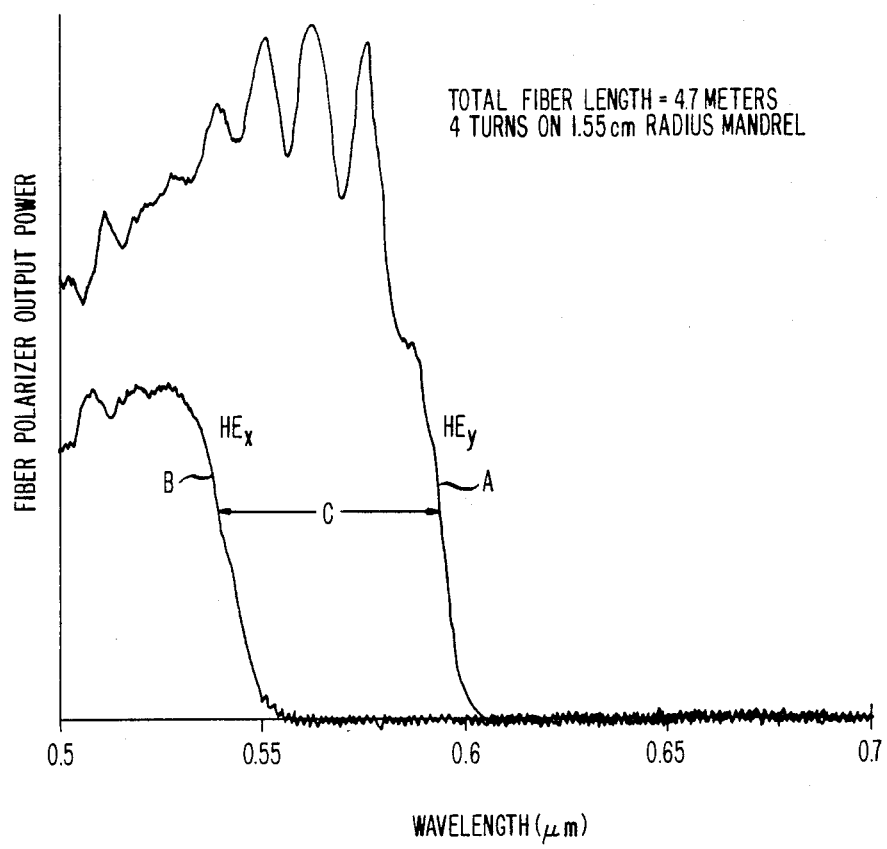
FIG. 6 contains a graph illustrating fiber output power as a function of wavelength for a predetermined fiber bending radius.

An alternative embodiment of the present invention is illustrated in FIG. 5. As shown, the fiber comprises a doped (for example, germanium) silica core region 40, a low index barrier layer 42, and a non-circular stress cladding region 44, where barrier layer 42 may comprise flourine-doped $SiO_2$. In this particular embodiment, tunneling occurs between core region 40 and stress cladding region 44. Barrier layer 42 functions to decrease the loss at longer wavelengths due to the presence of boron in stress cladding region 44. A graph illustrating fiber output power versus wavelength for unpolarized white light excitation of a single-mode single-polarization fiber formed in accordance with the present invention is illustrated in FIG. 6. Curve A is associated with the transmitted polarization of propagation $n_\parallel$ and curve B is associated with the suppressed polarization of propagation $n_\perp$. As can be seen by reference to FIG. 6, when the wavelength of the transmitted light reaches approximately 0.54 microns, the two polarizations of the fundamental mode begin to split significantly, and when the input light comprises a wavelength of approximately 0.56 microns, the undesired polarization of propagation is suppressed, that is, comprises negligible output power. This split between the two polarizations of the fundamental mode exists over the bandwidth, C, illustrated in FIG. 6, thereby yielding a fiber polarizer comprising a significantly larger bandwidth than available with prior art devices.

In one arrangement of the present invention, the fiber polarizer may be bent to include a predetermined bending radius or wrapped around a rod of predetermined diameter, where the operating wavelength of the polarizer shifts as a function of the bending radius. Therefore, a fiber polarizer may be tuned to a desired wavelength of operation merely by bending, or wrapping, the fiber polarizer. The transmission data of FIG. 6 were obtained with four turns of a polarizer fiber, formed in accordance with the present invention, wound with a 1.5 cm bending radius. The same fiber may be wound on a 14 cm diameter rod, and will function as a polarizer between 0.6 and 0.64 μm.

What is claimed is:

1. An optical fiber for propagating a single polarization of a single mode wave comprising
   a central core region comprising a first refractive index ($n_1$);
   a cladding layer surrounding the central core region and comprising a refractive index ($n_2$) less than said refractive index of said central core region;
   a surrounding region formed in intimate contact with said cladding layer and comprising a refractive index ($n_3$) greater than said refractive index of said cladding layer and less than said refractive index of said central core region; and
   means for inducing a stress birefringence capable of separating said single mode wave into a pair of orthogonally polarized waves wherein a first orthogonally polarized wave is propagated down said central core region and a second orthogonally polarized wave is attenuated by tunneling through said cladding layer.

2. An optical fiber formed in accordance with claim 1 wherein the surrounding region includes a first stress lobe and a second stress lobe disposed on opposite sides of the cladding layer.

3. An optical fiber formed in accordance with claim 1 wherein the cladding layer comprises a layer of non-circular cross-section, comprising a wide and a narrow dimension, surrounding the central core region such that said cladding layer is in close proximity to said central core region along the narrow dimension of said cladding layer, and the surrounding region comprises a layer completely surrounding said first cladding region.

4. An optical fiber formed in accordance with claim 3 wherein the surrounding region comprises a layer of circular cross-section.

5. An optical fiber formed in accordance with claim 3 wherein the surrounding region comprises a layer of non-circular cross-section.

6. An optical fiber formed in accordance with claim 1 wherein the cladding layer comprises a layer of non-circular cross-section, comprising a wide and a narrow dimension, surrounding the central core region such that said cladding layer is in intimate contact with said central core region along the narrow dimension of said cladding layer, and the surrounding region comprises a layer completely surrounding said cladding layer.

7. An optical fiber formed in accordance with claim 6 wherein the surrounding region comprises a layer of circular cross-section.

8. An optical fiber formed in accordance with claim 6 wherein the surrounding region comprises a layer of non-circular cross-section.

9. An optical fiber formed in accordance with claim 1 wherein the central core region comprises $SiO_2$, the cladding layer comprises boron-doped $SiO_2$, and the surrounding region comprises fluorine-doped $SiO_2$.

10. An optical fiber formed in accordance with claim 1 wherein the central core region comprises germanium-doped $SiO_2$, the cladding layer comprises boron-doped and germanium-doped $SiO_2$, and the surrounding region comprises $SiO_2$.

11. An optical fiber formed in accordance with claim 1 wherein the central core region comprises $SiO_2$, a barrier layer comprises fluorine-doped $SiO_2$, and the surrounding region comprises $SiO_2$.

12. An optical fiber formed in accordance with claim 1 wherein the central core region comprises germanium-doped $SiO_2$, a barrier layer comprises fluorine-doped $SiO_2$; and a non-circular cladding layer comprises a combination of boron and an additional dopant in $SiO_2$.

13. An optical fiber formed in accordance with claim 12 where the additional dopant is germanium.

14. An optical fiber formed in accordance with claim 12 where the additional dopant is phosphorous.

15. An optical fiber formed in accordance with claim 1 wherein the core region is doped in a manner which raises the index of refraction associated therewith.

16. An optical fiber formed in accordance with claim 1 wherein said fiber is disposed to comprise a predetermined bending radius, wherein said predetermined bending radius is related to the operable wavelength of said optical fiber.

17. An optical fiber formed in accordance with claim 15 wherein said optical fiber is wrapped to form a coil-like structure.

* * * * *